Figure 1:
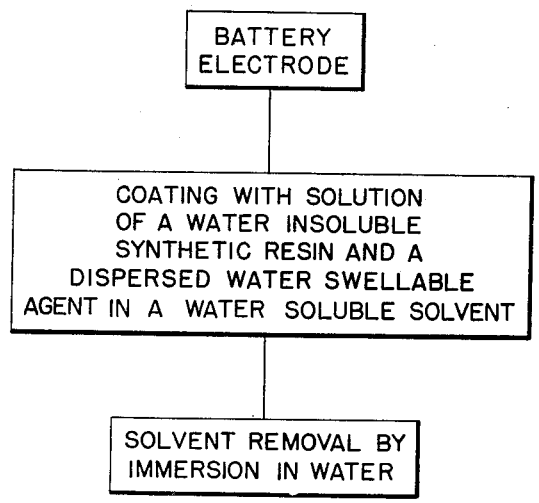

INVENTORS
MYRON A. COLER
ARNOLD S. LOUIS
BY

United States Patent Office
3,023,261
Patented Feb. 27, 1962

3,023,261
MONOLITHIC ELECTRODE-SEPARATOR STRUCTURE FOR ELECTROCHEMICAL CELLS
Arnold S. Louis, Hastings on Hudson, and Myron A. Coler, 56 Secor Road, Scarsdale, N.Y.
Filed Nov. 18, 1959, Ser. No. 853,826
13 Claims. (Cl. 136—19)

This invention relates to a monolithic electrode-separator and retainer for the active material of secondary batteries, employing alkaline electrolytes.

The general practice in preparing the negative and positive plates of storage batteries is to apply a paste of an active electrode material containing a binder to a generally flat plate having a lattice work or grid formed therein.

The physical changes to which the electrodes are subjected during the repeated cycle of charge and discharge tend to loosen the bond between the particles of the paste and between the paste and the grid. This results in dislodging portions of the active material of the plate which then drop to the bottom of the battery. This loss of material reduces the capacity of the battery and shortens its life. Still other particles of active material tend to "bridge" between electrodes and thus short circuit the cell.

Although various attempts have been made in the past to increase the bond of the paste, such as by increasing the density of the paste, these attempts, so far as we are aware, have not been entirely successful. On the contrary, they have usually resulted in reducing the output of the battery by reducing the porosity of the paste thereby reducing the accessibility of the acid to the active material in the plates.

The invention has been found effective as a coating on the negative and positive electrodes of a nickel-cadmium cell.

Other prior approaches have included the spraying of a web-like synthetic resin coating over the electrode as a retentive means. This approach is disadvantageous in that it is a complex process and not well adapted for continuous processing and difficult to accomplish in a uniform fashion.

The main object of the present invention is the provision of a battery plate which eliminates the aforementioned disadvantages.

Another object of the invention is the provision of a means for preventing dislodgement of the electrode paste without affecting the chemical action between the electrolyte and the paste which is necessary for the proper functioning of the battery.

Yet another object of the invention is the provision of a monolithic electrode-separator structure which will obviate the necessity of individual separators between adjacent electrodes thereby simplifying assembly and reducing the size of the battery as compared to conventional battery devices of equivalent capacity.

A further object of the invention is the provision of an improved electrode structure for an electrochemical cell.

Still other objects and advantages will become obvious and still others will be pointed out with particularity as the following description proceeds, taken in conjunction with the accompanying drawings.

Figure 2:
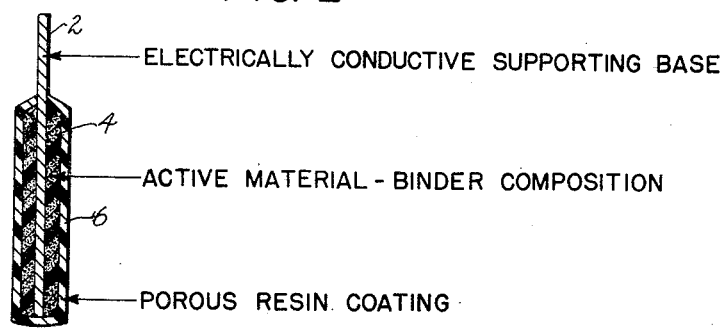

In the drawings:
FIGURE 1 is a flow sheet of the process of this invention.
FIGURE 2 shows in cross-section a typical electrode coated by the process of this invention.

Briefly stated, this invention comprises immersing an electrode formed by any one of the commonly practiced methods in a solution of a water insoluble synthetic resin dissolved in a solvent, which solvent is characterized by being highly water-soluble. The aforementioned solution has, in addition, dispersed therein a minor proportion of a water-swellable polymer which is insoluble in the particular water-soluble solvent employed.

After immersion in the solution the wet electrode is removed and in turn immersed in water. The water dissolves out the solvent, setting the resin in the form of a porous film. The presence of the water-swellable polymer contributes to the free access of electrolyte to the electrode in a complete battery and at the same time permits a strong separator to be formed.

The most suitable synthetic resins presently known for this purpose are polyvinyl chlorides and polyvinyl chloride compositions containing other polymers and, in particular, copolymers containing 50% to 80% polyvinyl chloride and the balance polyacrylonitrile.

Other resins useful for this purpose are polyvinyl butyral, cellulose acetate, polyvinylidene chloride and compositions containing both polyvinyl chloride and polyvinyl acetate.

Suitable swellable materials include starch, gelatin, cold water insoluble polyvinyl alcohol, zein, carboxy methyl cellulose, carboxy ethyl cellulose, and collagens such as bone glues.

The water-swellable material should be present in a range of from at least ½ part to 6 parts per each part of water-insoluble resin.

It is desirable to employ a maximum amount of water-swellable material consistent with maintaining adequate mechanical film strength.

The quantity of solvent present in the solution of resin containing the dispersion of water-swellable material as applied to the electrode is limited in the low end of the range to the quantity required to produce a fluid composition. The high end of the range of the quantity limitation is critical and the applied composition may not contain more than 95% solvent by weight.

In FIGURE 1 there is shown the sequence of steps wherein the electrode is coated with the synthetic resin solution containing the water-swellable polymeric material and then the coated electrode is placed in a water bath to dissolve out the water-soluble solvent.

In FIGURE 2 there is shown the resulting coated positive electrode having an electrically conductive supporting base, which is, for example, formed of a nickel wire screen 2 coated with a composition 4, containing a mixture of 3 parts nickel hydroxide and 2 parts of an electrically conductive resin composition. The resin composition comprised equal parts acetylene black and a copolymer containing 85 parts polyvinyl chloride and 15 parts polyacrylonitrile. Proportions recited in this application are to be understood to be in parts by weight. The electrode is encased in the porous coating 6 of this invention.

Example 1

A solution was prepared by dissolving 67 grams of a copolymer comprising 80 parts by weight of polyvinyl chloride and 20 parts by weight of polyacrylonitrile in 540 grams of dimethyl formamide by means of a high speed propeller mixer. Then, 200 grams of polyvinyl alcohol, having a molecular weight of about 1500, was introduced and mixing continued for 5 minutes. Positive electrodes of the above-described type, 0.027" thick, were then dipped into the solution so as to form a coating over their surface.

The wet coated electrodes were then dipped into water at room temperature (68° F.) in order to fix the coating by dissolving out the dimethyl formamide.

The coating was then washed in running water for 2 hours to assure the removal of all traces of the dimethyl formamide.

After drying at 60° C. it was found that an electrode originally weighing 12.5 grams had formed over it a separator coating weighing 2.4 grams.

A composition containing 69 parts cadmium powder, 31 parts of cadmium oxide, and 3 parts of an 85:15 polyvinyl chloride-polyacrylonitrile copolymer as a binder was applied to a similar nickel screen to form a negative electrode strip having an overall electrode thickness of 0.019″.

The resulting coated positive electrode was assembled between two negative electrodes clamped together by means of an adhesive binding tape. The assembly was then inserted in an aqueous electrolyte solution containing 25% by weight of potassium hydroxide. The cell provided a 4.2 ampere hour/cu. in. output to 0.6 v. cutoff, at a two hour discharge rate, after 46 cycles of operation. This result was satisfactory, being comparable to that obtained with a satisfactory set of "standard" electrodes employing conventional individual separators.

A similarly prepared positive electrode was hand flexed, over a two inch diameter mandrel, from a straight position to a 90° bend position and returned to the straight position as a test of adherency of the coating After 5 cycles of flexing the coating was found to be adherent thereby establishing the adequacy of the coating to sustain the handling necessary during the assembly of the battery. Based on the obvious freedom from stress marks this coating was rated as "excellent."

Example 2

The procedure of Example 1 was repeated using 540 grams of isophorone as the solvent in place of the dimethyl formamide. The electrical performance of a battery made with the resulting coated electrode was satisfactory. The adhesion of the coating was satisfactory as evidenced by sustaining 5 cycles of the hand flexing test described in the procedure of Example 1. Based on the appearance of a moderate number of stress marks this coating was rated as "very good."

Example 3

The procedure of Example 1 was repeated using 100 grams of polyvinyl chloride, 400 grams of starch and 600 grams of dimethyl formamide. That a satisfactory coating was obtained was evidenced by testing in a battery and obtaining a satisfactory current output. The adhesion of the coating was satisfactory as evidenced by sustaining 5 cycles of the hand flexing test described in Example 1. This coating was visually rated as "very good."

Example 4

The procedure of Example 1 was repeated with an equivalent weight of carboxy methyl cellulose substituted for the polyvinyl alcohol. A coating was obtained which satisfactorily retained the active material in the plate as evidenced by examination after 50 cycles of operation.

Example 5

Employing the procedure of Example 1, 50 grams of polyvinyl butyral were dissolved in 800 grams of methyl alcohol. Then 300 grams of carboxy ethyl cellulose were dispersed in the solution.

An electrode was then dipped into the resulting coating material and then in turn washed with water (68° F.)

Without drying, the electrode was assembled between two negative electrodes and immersed in an electrolyte solution.

The resulting electrode was found to have a 1.8 gram coating deposited.

Under test the electrode performed satisfactorily in a battery.

The coated electrode was capable of being flexed without apparent detriment and was visually rated as "excellent."

Example 6

Polyvinylidene chloride was substituted on an equal weight basis for the polyvinyl chloride-polyacrylonitrile copolymer of Example 1. The results electrically were comparable, however, a tendency toward separation after flexing was noted. Appearance rating assigned was "fair."

Example 7

A 65:35 copolymer of polyvinyl chloride-polyacrylonitrile was substituted for the 80:20 copolymer of Example 1 in the same proportion. The results were comparable with respect to electrical performance, but the film in the instance was found to show slight traces of separation after being flexed. The comparative rating assigned on the basis of appearance was "very good."

Example 8

Example 1 was repeated using 80 grams of cellulose acetate, 250 grams of zein and 600 grams of acetone. The resulting electrode assembly performed satisfactorily in a battery. Adhesion of the separator coating was only fair under the flexing test.

In addition to "copolymers" of polyvinyl chloride, which are obtained by the copolymerization of mixed monomers, compatible mixtures produced by blending of polymers containing at least 50% polyvinyl chloride may be employed.

The resin, the water-soluble solvent for the resin, and the water-swellable material should be mutually non-reactive and chemically resistant to the electrolyte.

The product resulting from the process shown in the flow chart of FIGURE 1 may be directly incorporated into a battery or may first be dried.

If the battery assembly operation is to be performed at a different location, or the plates are to be stockpiled, then it is preferable to air-dry or oven-dry the plates at moderate temperatures.

Unless specifically stated to be to the contrary, all proportions are intended to be in terms of weight.

What is claimed is:

1. The process of encasing a battery electrode with a film porous to alkaline liquid electrolyte normally employed in combination with said electrode, comprising the steps of applying to said electrode a composition comprising a solution of a water-insoluble resin in a water-soluble solvent, having dispersed therein a water-swellable solid not soluble in said solvent, and dissolving out, with water, said water-soluble solvent, said water-insoluble resin and said water-swellable solid being mutually non-reactive and chemically resistant to said electrolyte and present in the ratio of from 0.5 to 6 parts of said water-swellable solid to each part of said resin, sufficient solvent being present to provide a fluid composition containing not more than 95% solvent by weight of composition.

2. The process of encasing a battery electrode with a film porous to alkaline liquid electrolyte normally employed with said electrode, comprising the steps of making a composition comprising a solution of a water-insoluble resin in a water-soluble solvent, dispersing therein a water-swellable solid not soluble in said water-soluble solvent, coating said electrode with said composition and, in turn, immersing said electrode in water to dissolve out said water-soluble solvent, wherein said water-swellable solid is selected from the group consisting of: polyvinyl alcohol, zein, gelatin, starch, carboxy methyl cellulose, carboxy ethyl cellulose, and collagens, said water-insoluble resin and said water-swellable solid being mutually non-reactive and chemically resistant to said electrolyte and present in the ratio of from 0.5 to 6 parts of said water-swellable solid to each part of said resin, sufficient solvent being present to provide a fluid composition containing not more than 95% solvent by weight of composition.

3. The process of encasing a battery electrode with a coating porous to an alkaline liquid electrolyte normally employed with said electrode, comprising the steps of making a composition of a water-insoluble resin selected from the group consisting of: polyvinyl chloride, polyvinyl chloride-polyacrylonitrile compositions, polyvinyl butyral, cellulose acetate, polyvinylidene chloride, and polyvinyl chloride-polyvinyl acetate compositions, in a water-soluble solvent dispersing therein a water-swellable solid not soluble in said water-soluble solvent, immersing said electrode in said composition, removing said electrode from said composition, and in turn immersing said electrode in water so as to dissolve out said water-soluble solvent, wherein said water-swellable solid is selected from the group consisting of: polyvinyl alcohol, zein, gelatin, starch, carboxy ethyl cellulose, carboxy methyl cellulose, and collagens, said water-insoluble resin and said water-swellable solid being mutually non-reactive and chemically resistant to said electrolyte and present in the ratio of from 0.5 to 6 parts of said water-swellable solid to each part of said resin, sufficient solvent being present to provide a fluid composition containing not more than 95% solvent by weight of composition.

4. The process of encasing a battery electrode with a film porous to an alkaline liquid electrolyte normally employed with said electrode, comprising the steps of making a composition comprising a solution of polyvinyl chloride in a water-soluble solvent, dispersing therein a water-swellable solid not soluble in said water-soluble solvent, said water-swellable solid being selected from the group consisting of: polyvinyl alcohol, zein, gelatin, starch, carboxy methyl cellulose, carboxy ethyl cellulose and collagens, coating said electrode with said composition, and immersing said coated electrode in water so as to dissolve out said water-soluble solvent, said polyvinyl chloride and said water-swellable solid being mutually non-reactive and chemically resistant to said electrolyte and present in the ratio of from 0.5 to 6 parts of said water-swellable solid to each part of said resin, sufficient solvent being present to provide a fluid composition containing not more than 95% solvent by weight of composition.

5. The process of encasing a battery electrode with a film porous to an alkaline liquid electrolyte normally employed with said electrode, comprising the steps of making a composition comprising a solution of polyvinyl butyral, in a water-soluble solvent, dispersing therein a water-swellable solid not soluble in said water-soluble solvent, coating said electrode with said solution, and immersing said electrode in water so as to dissolve out said water-soluble solvent, wherein said water-swellable solid is selected from the group consisting of: polyvinyl alcohol, zein, gelatin, starch, carboxy methyl, cellulose, carboxy ethyl cellulose, and collagens, said polyvinyl butyral and said water-swellable solid being mutually non-reactive and chemically resistant to said electrolyte and present in the ratio of from 0.5 to 6 parts of said water-swellable solid to each part of said resin, sufficient solvent being present to provide a fluid composition containing not more than 95% solvent by weight of composition.

6. The process of encasing a battery electrode with a film porous to an alkaline liquid electrolyte normally employed with said electrode, comprising the steps of making a composition comprising a solution of a copolymer of polyvinyl chloride and polyacrylonitrile in a water-soluble solvent having dispersed therein from 0.5 to 6 parts by weight of polyvinyl alcohol per part by weight of said copolymer, immersing said electrode in said composition, removing said electrode from said composition and immersing said electrode in water so as to dissolve out said water-soluble solvent, sufficient solvent being present to provide a fluid composition containing not more than 95% solvent by weight of composition.

7. The process of claim 6 wherein said copolymer contains from 20 to 50 parts by weight of polyacrylonitrile per 100 parts of copolymer, sufficient solvent being present to provide a fluid composition containing not more than 95% solvent by weight of composition.

8. The process of claim 6 wherein said water-soluble solvent is dimethylformamide.

9. The process of claim 5 wherein said water-soluble solvent is isophorone.

10. A battery electrode coated with a continuous film porous to an alkaline liquid electrolyte normally employed with said electrode, composed of a water-insoluble resin selected from the group consisting of: polyvinyl chloride, polyvinyl chloride-polyacrylonitrile compositions, polyvinyl butyral, cellulose acetate, polyvinylidene chloride, and polyvinyl chloride-polyvinyl acetate compositions, and distributed through said resin about 0.5 to 6 parts by weight, per part by weight of said water-insoluble resin, of a water-swellable solid selected from the group consisting of: polyvinyl alcohol, zein, gelatin, starch, carboxy methyl cellulose, carboxy ethyl cellulose, and collagens, said water-insoluble resin and said water-swellable solid being mutually non-reactive and chemically resistant to said electrolyte.

11. A battery electrode coated with a film porous to an alkaline liquid electrolyte normally employed with said electrode, said film being composed of a water-insoluble resin consisting of at least 50% polyvinyl chloride and the balance polyacrylonitrile, and distributed through said resin from 0.5 to 6 parts by weight of a water-swellable solid, per part by weight of said water-insoluble resin, selected from the group consisting of: polyvinyl alcohol, zein, gelatin, starch, carboxy methyl cellulose, carboxy ethyl cellulose, and collagens, said water-insoluble resin and said water-swellable solid being mutually non-reactive and chemically resistant to said electrolyte.

12. A battery electrode coated with a film porous to an alkaline liquid electrolyte normally used with said electrode, said film being composed of about 1 part by weight of polyvinyl chloride and distributed through said polyvinyl chloride from about 0.5 to 6 parts by weight of a water-swellable solid selected from the group consisting of: polyvinyl alcohol, zein, gelatin, starch, carboxy methyl cellulose, carboxy ethyl cellulose, and collagens, said polyvinyl chloride and said water-swellable solid being mutually non-reactive and chemically resistant to said electrolyte.

13. A battery electrode coated with a film porous to an alkaline liquid electrolyte normally used with said electrode, said film being composed of about 1 part by weight, of a resin consisting of at least 50% polyvinyl chloride and the balance polyacrylonitrile, and distributed through said resin from about 0.5 to 6 parts by weight of polyvinyl alcohol.

References Cited in the file of this patent

UNITED STATES PATENTS

| | | |
|---|---|---|
| Re. 18,214 | Behrman | Sept. 29, 1931 |
| 1,710,617 | Haddon et al. | Apr. 23, 1929 |
| 2,542,527 | Honey et al. | Feb. 20, 1951 |
| 2,673,230 | Brennan | Mar. 23, 1954 |
| 2,729,694 | Ellis | Jan. 3, 1956 |
| 2,747,009 | Kirkwood et al. | May 22, 1956 |
| 2,953,622 | Gray | Sept. 20, 1960 |